April 22, 1958   F. R. EDMONSON   2,831,710
FLUID COUPLING FOR FLUID COOLED ROLL
Filed April 18, 1956

INVENTOR:
FAY R. EDMONSON,
BY: *Donald G. Dalton*
his Attorney.

United States Patent Office 2,831,710
Patented Apr. 22, 1958

2,831,710

FLUID COUPLING FOR FLUID COOLED ROLL

Fay R. Edmonson, Birmingham, Ala., assignor to United States Steel Corporation, a corporation of New Jersey Application April 18, 1956, Serial No. 579,113

6 Claims. (Cl. 285—190)

The present invention relates generally to fluid fittings and more particularly to a fluid coupling especially suitable for use as a fluid outlet for fluid-cooled rolls.

It is, accordingly, an object of my invention to provide a rotary fluid coupling for a fluid-cooled roll which can be adjustably mounted in fluid-tight disposition around the radial fluid outlets on the shaft of the roll to receive the fluid emitted from the roll and conduct it away from the roll without retarding the flow of liquid in the cooling system of the roll.

It is another object of the invention to provide a fluid coupling as described above which has as its principal components a fixed outlet housing having a rotatable shaft-engaging sleeve and bushing contained therein and a system of connected fluid passageways in the housing, sleeve and bushing which are arranged in a novel manner to provide an outlet for fluid coolant from the roll without interfering with driving connections on the shaft.

A further object of my invention is to provide a fluid coupling as described above wherein the fluid passageways in the sleeve and bushing are disposed in circumferential grooves in the inner walls of the sleeve and bushing so as to afford means for adjusting the coupling relative to the radial outlets of the fluid cooled roll.

It is a further object of my invention to provide a fluid coupling for a water cooled roll which is durably constructed of a minimum number of inexpensive components.

These and other objects will become more apparent after referring to the following specification and attached drawings, in which.

Figure 1:
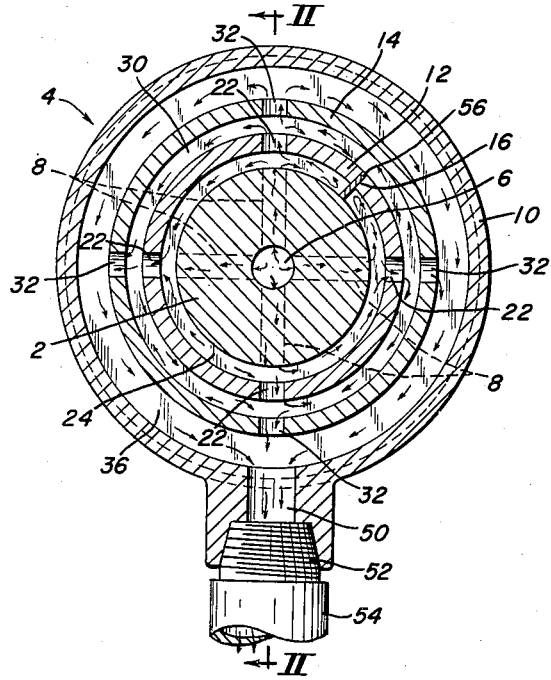
Figure 1 is a vertical cross-sectional view.
Figure 2:
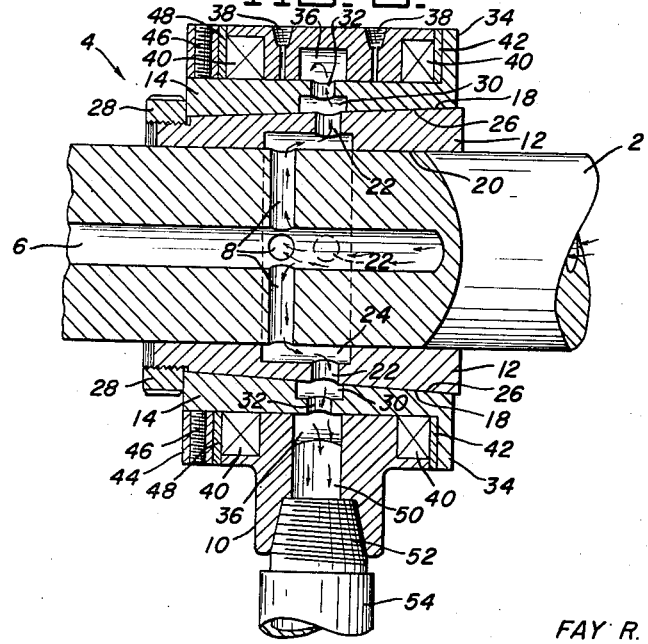
Figure 2 is a longitudinal cross-sectional view taken on lines II—II of Figure 1.

Referring more particularly to the drawings reference numeral 2 designates a water cooled roll shaft having the fluid coupling of the invention, designated generally by reference numeral 4 affixed thereon. The shaft 2 is provided with an axial duct 6 which conducts water, as indicated by arrows in Figure 1, from the body of the roll (not shown) to four circumferentially spaced radial fluid outlets 8. The left end of the shaft 2, as viewed in Figure 2, is connected with a drive spindle (not shown). The end of the duct 6 toward the drive spindle is plugged in conventional manner.

The fluid coupling 4 includes a fixed retaining housing 10, a rotatable steel sleeve 12, a steel bushing 14 interposed between the inner wall of the housing and the sleeve. As will be more fully described hereinafter, the sleeve and bushing are rigidly joined together for coincident rotation within the housing. The sleeve 12 which is split as at 16 has a frusto-conical exterior 18 and a uniform diameter bore 20. The bore 20 has a diameter slightly smaller than the outside diameter of the shaft 2. Four circumferentially spaced radial fluid passageways 22 are provided through the wall of the sleeve 12 which communicate with a circumferential groove 24 in the inner wall of the sleeve.

The bushing 14 is circumferentially mounted around the sleeve 12 and has a tapered bore 26 which snugly fits on and cooperates with the frusto-conical exterior of the sleeve, as shown in Figure 2; maintains a pressure fit of the sleeve on the shaft. The bushing 14 is held in position and axial displacement thereof is prevented by a lock nut 28 which is threaded on the end of the sleeve 12 and bears against the end of bushing 14. Lock nut 28 also serves to force the bushing a limited distance axially relative to sleeve. This provides a means for increasing the pressure of the bushing on the sleeve to insure a water-tight press-fit of the sleeve around the shaft. Bushing 14 is provided with an inner circumferential groove 30 intermediate its ends which communicates with four circumferentially spaced radial fluid passageways 32 through the wall of the bushing. The groove 30 also communicates with the radial passageways 22 in the sleeve. An integral circumferential flange 34 projects radially outwardly from the end of the bushing remote from the nut 28 and extends closely adjacent one end of the housing 10.

An inner circumferential groove 36 intermediate the ends of housing 10 communicates with radial passageways 32. The housing 10 may be provided with lubricant fittings 38 for introducing lubricant between the interfitting surfaces of the rotatable bushing 14 and the housing 10. Spaced annular oil seals 40 are disposed in the housing 10 adjacent the ends thereof.

A thrust ring 42, which may be made of brass or other soft metal, is interposed between the flange 34 and the adjacent end of the housing 10 for preventing wear on the two parts. The housing 10 is held in place by means of a steel retainer ring 44 which is secured to the bushing 14 by set screws 46, as shown in Figure 2. A soft metal thrust ring 48 similar to ring 42 is circumferentially disposed on the bushing 14 between the retaining ring 44 and the adjacent edge of the housing 10. An outlet duct 50, which may be tapped as at 52 for connection with a fluid line fitting 54, extends from groove 36.

In operation, before the roll shaft 2 is connected with the driving shaft, the split sleeve 12 is mounted circumferentially on the driving end of shaft 2 and moved axially thereon until the inner groove 24 in the sleeve is positioned over the circumferential plane of the radial outlets 8 on the shaft. The groove 24 permits a degree of adjustment over the outlets 8. The split 16 in the sleeve 12 permits the sleeve, which has an internal bore slightly smaller in diameter than the outside diameter of the shaft 2 to be easily moved along the shaft. Compressible waterproof gasket or packing 56 in the split 16 prevents leakage.

After the sleeve has been properly positioned, the bushing 14 is mounted around the sleeve. The tapered bore of the bushing 14 cooperates with the frusto-conical exterior of the sleeve 12 to exert a tightening pressure on the sleeve which in turn tightly engages the shaft 2 so that a liquid-tight press-fit of the sleeve on the shaft results. The lock nut 28 is then threaded on the end of the sleeve 12. When the bushing is in proper position, the groove 30 therein overlays the circumferential plane of the radial passageways 22 in the sleeve 12, as best shown in Figure 2.

The thrust ring 42 is then mounted on the bushing 14 adjacent the flange 34 and the housing 10 is slipped on the bushing and positioned with one edge adjacent the thrust ring 42. Thrust ring 48 is then mounted on the bushing adjacent the edge of the housing remote from thrust ring 42. The retaining ring 44 is then positioned on the bushing 14 and secured thereto by means of the set screws 46 to secure the housing 10 in position. Sufficient clearance is provided between the housing 10 and the bushing 14, and between the retaining ring 44 and the housing 10 to permit free coincident rotation of the shaft-engaging sleeve 10 and the bushing 14 within the housing 10.

In normal operation fluid is supplied to the cooling system of the roll through a conventional fitting on the non-driven end (not shown) of the roll shaft. After the fluid coolant circulates through the body of the roll it passes through the duct 6 and out of the radial outlets 8. As shown by the arrows in Figure 1, the fluid coolant progresses through the passageways in the sleeve 12 and bushing 14 and enters the groove 36 in the housing 10 from whence it is emitted through the outlet duct 50.

It will be noted that although I have shown four radial fluid passageways in the sleeve and in the bushing, more or less than four may be provided as desired.

While one embodiment of my invention has been shown and described, it will be apparent that other adaptations and modifications may be made without departing from the scope of the following claims.

I claim:

1. A fluid coupling for a shaft having a plurality of circumferentially spaced radial fluid outlets which comprises a sleeve having a frusto-conical exterior and having a substantially cylindrical bore adapted to fit on said shaft overlying said radial outlets, said shaft being of uniform diameter throughout its area of contact with said sleeve, a bushing having a conical bore and a substantially cylindrical exterior seated on said sleeve, means for rigidly securing said bushing on said sleeve, said sleeve and bushing having internal circumferential grooves and radial holes communicating with said grooves, a stationary housing in which said bushing is rotatable, said housing having annular seals at opposite ends thereof and an internal circumferential groove communicating with the holes in said bushing, and a fluid conduit connected to said housing.

2. A fluid coupling in accordance with claim 1 characterized by said sleeve having a bore diameter slightly smaller than the outside diameter of said shaft whereby said sleeve is adapted to be pressure fitted on said shaft with the groove in said sleeve communicating with said outlets.

3. A fluid coupling in accordance with claim 1 characterized by said bushing having a radial thrust bearing flange at one end, and means secured to the bushing for retaining the housing thereon.

4. A fluid coupling in accordance with claim 3 characterized by said retaining means being a ring secured on said bushing.

5. A fluid coupling in accordance with claim 1 characterized by said rigidly securing means including a nut threaded on one end of said sleeve and bearing against said bushing.

6. A fluid coupling in accordance with claim 1 characterized by said sleeve having a longitudinal slot through the wall thereof, and a gasket positioned in said slot.

References Cited in the file of this patent

UNITED STATES PATENTS

| | | |
|---|---|---|
| 928,797 | Rohrbacher | July 20, 1909 |
| 932,060 | Richards | Aug. 24, 1909 |
| 982,028 | Austin | Jan. 11, 1911 |
| 1,081,768 | Nash | Dec. 16, 1913 |
| 1,725,713 | Jobe | Aug. 20, 1929 |
| 2,459,643 | Hartley | Jan. 18, 1949 |